United States Patent
Hagans et al.

[11] Patent Number: 6,055,079
[45] Date of Patent: Apr. 25, 2000

[54] OPTICAL KEY SYSTEM

[75] Inventors: Karla G. Hagans, Livermore; Robert E. Clough, Danville, both of Calif.

[73] Assignee: The Regents of the University of California, Oakland, Calif.

[21] Appl. No.: 08/908,261

[22] Filed: Aug. 7, 1997

[51] Int. Cl.[7] .................................................. H04B 10/10
[52] U.S. Cl. .......................... 359/147; 359/142; 359/168; 340/825.31; 307/10.1
[58] Field of Search .................................... 359/142, 143, 359/144, 147, 172, 168; 340/425.25, 426, 534, 825.31, 825.34; 180/287, 289, 107; 307/10.1, 10.2, 10.3, 10.4, 10.5, 10.6

[56] References Cited

U.S. PATENT DOCUMENTS

| | | | |
|---|---|---|---|
| 4,509,093 | 4/1985 | Stellberger | 340/825.31 |
| 4,788,542 | 11/1988 | Tanabe | 340/825.31 |
| 5,254,842 | 10/1993 | Posner et al. | 235/382 |
| 5,491,470 | 2/1996 | Viligdan | 340/825.31 |
| 5,543,665 | 8/1996 | Demarco | 307/10.2 |
| 5,583,383 | 12/1996 | Denz et al. | 307/10.2 |
| 5,596,317 | 1/1997 | Brinkmeyer et al. | 340/825.31 |
| 5,625,349 | 4/1997 | Disbrow et al. | 340/825.31 |
| 5,790,043 | 8/1998 | Hettich et al. | 340/825.31 |
| 5,869,908 | 2/1999 | Moczygemba et al. | 307/10.5 |
| 5,889,472 | 3/1999 | Nagel et al. | 340/825.31 |
| 5,889,603 | 3/1999 | Roddy et al. | 359/168 |
| 5,898,397 | 4/1999 | Murray | 341/176 |

OTHER PUBLICATIONS

Parallax, Inc., Basic Stamp, company literature. Sep. 1995.
Microchip, PIC 16C5X, company literature. 1995.
Micromint, Inc., Micromint Chips PicStic, company literature. 1996.
Hitachi, HL7851G, company literature. Jun. 1993.
Wavelength Electronics™, LDD P Series, company literature. Oct. 1994.
Photonic Power Systems, Inc., PPC–6E–ST, company literature. Oct. 1994.

*Primary Examiner*—Leslie Pascal
*Attorney, Agent, or Firm*—Alan H. Thompson

[57] ABSTRACT

An optical key system comprises a battery-operated optical key and an isolated lock that derives both its operating power and unlock signals from the correct optical key. A light emitting diode or laser diode is included within the optical key and is connected to transmit a bit-serial password. The key user physically enters either the code-to-transmit directly, or an index to a pseudorandom number code, in the key. Such person identification numbers can be retained permanently, or ephemeral. When a send button is pressed, the key transmits a beam of light modulated with the password information. The modulated beam of light is received by a corresponding optical lock with a photovoltaic cell that produces enough power from the beam of light to operate a password-screen digital logic. In one application, an acceptable password allows a two watt power laser diode to pump ignition and timing information over a fiberoptic cable into a sealed engine compartment. The receipt of a good password allows the fuel pump, spark, and starter systems to each operate. Therefore, bypassing the lock mechanism as is now routine with automobile thieves is pointless because the engine is so thoroughly disabled.

3 Claims, 5 Drawing Sheets

OPTICAL KEY SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to locking devices and more particularly to highly secure optically based keys and locks that are practically invulnerable to all attempts to get unauthorized entry in to a vehicle.

2. Description of Related Art

The steering column locks that began appearing on automobiles in the 1970's only slowed down car thieves a little at first. It was discovered that the lock mechanisms could be punched out with slide hammers to free the steering wheel, and the electrical switch could then be manipulated with a screwdriver.

SUMMARY OF THE INVENTION

An object of the present invention is to provide an optical lock system that is secure from unauthorized attempts to bypass it.

A further object of the present invention is to provide an optical lock system that disables the engine of the vehicle it protects when unauthorized attempts are made to bypass it.

Briefly, an optical key system embodiment of the present invention comprises a battery-operated optical key and an isolated lock that derives both its operating power and unlock signals from the correct optical key. A light emitting diode or laser diode is included within the optical key and is connected to transmit a bit-serial password. The key user physically enters either the code-to-transmit directly, or an index to a pseudorandom number code, in the key. Such person identification numbers can be retained permanently, or ephemeral. When a send button is pressed, the key transmits a beam of light modulated with the password information. The modulated beam of light is received by a corresponding optical lock with a photovoltaic cell that produces enough power from the beam of light to operate a password-screen digital logic. In one application, an acceptable password allows a two watt power laser diode to pump ignition and timing information over a fiberoptic cable into a sealed engine compartment. The receipt of a good password allows the fuel pump, spark, and starter systems to each operate. Therefore, bypassing the lock mechanism as is now routine with automobile thieves is pointless because the engine is so thoroughly disabled.

An advantage of the present invention is an optical lock system is provided that is secure from unauthorized attempts to bypass it.

Another advantage of the present invention is an optical lock system is provided that keeps an engine in a vehicle disabled until its use is authorized.

DETAILED DESCRIPTION OF THE INVENTION

Figure 1:
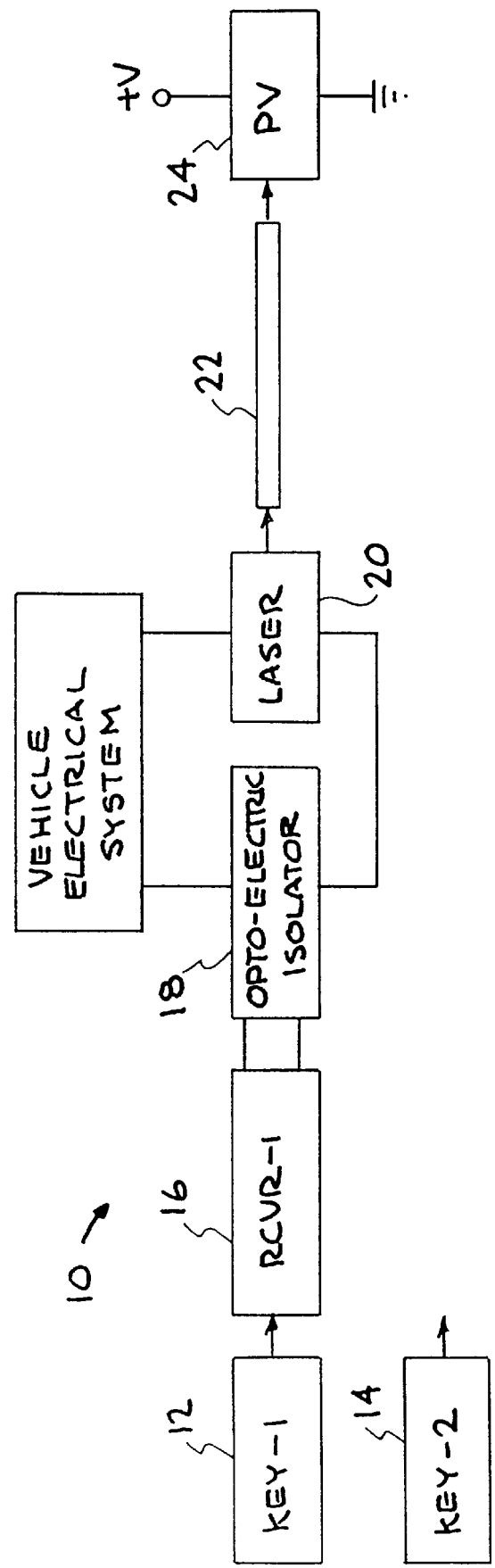
FIG. 1 is a function block diagram of an optical lock system embodiment of the present invention that uses only one key.

FIG. 1 illustrates an optical lock embodiment of the present invention, referred to herein by the general reference numeral 10. A first optical key (KEY-1) 12 and a second optical key (KEY-2) 14 each produce different bit serial optical coded message outputs at the touch of a button. Such keys are preferably inserted into slots that help direct their light output with a user password modulated on the light carrier to a optical lock receiver (RCVR-1) 16. When RCVR-1 16 recognizes an authorized keyholder's password, it operates an opto-electric isolator 18 that turns on a laser diode 20 using a vehicle's electrical power system (VES). The laser diode 20, for example operating at two watts input, pipes its light output down a fiberoptic cable 22 to a photovoltaic (PV) cell 24. A voltage output is produced by the PV cell 24 which can be used to operate mechanical locks, solenoids, actuators, and ignition systems in cars.

Figure 2:
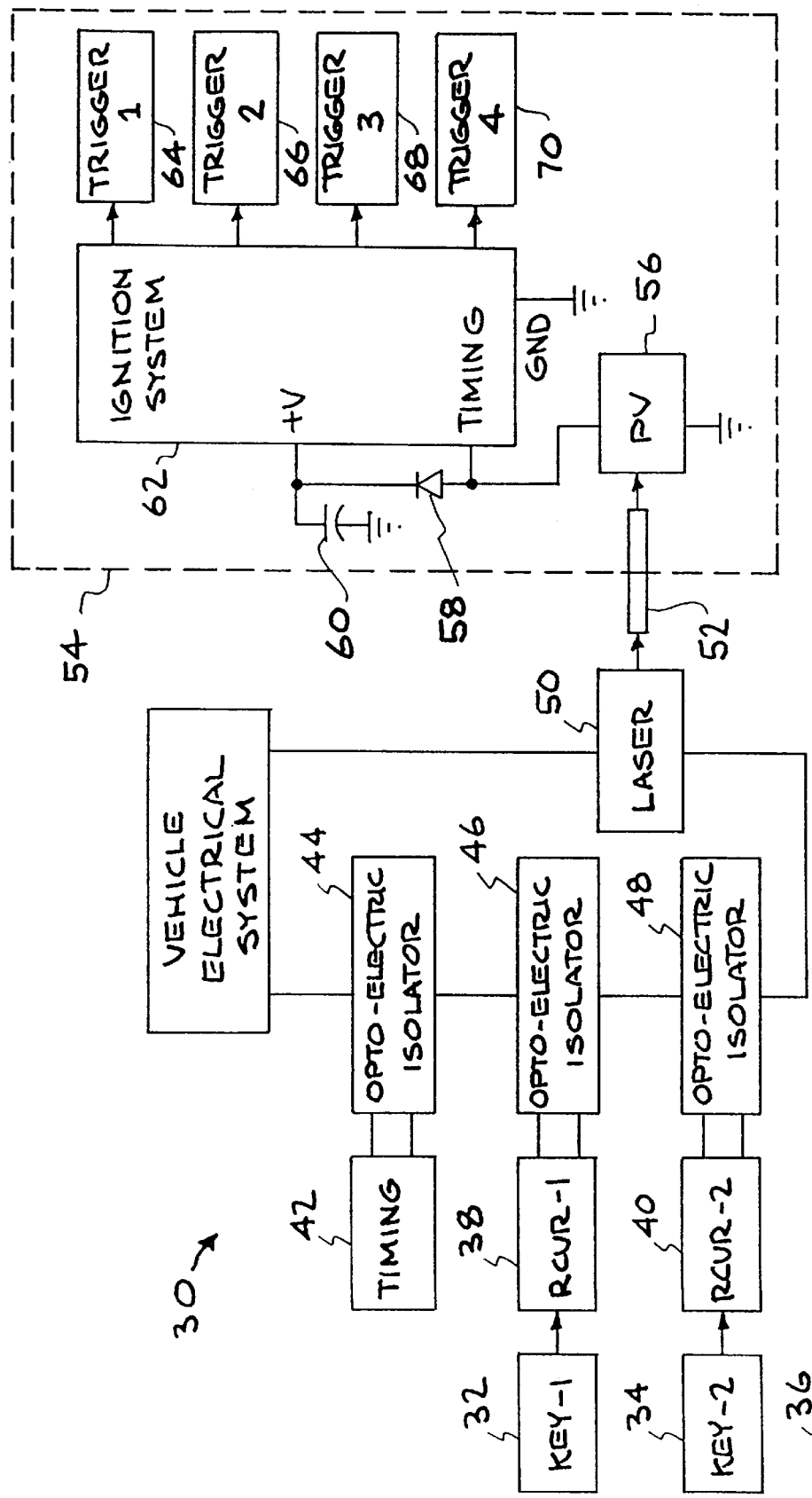
FIG. 2 is a function block diagram of an enhanced security optical lock system embodiment of the present invention that requires two keys, and that keeps an engine in a vehicle disabled until its use is authorized.

FIG. 2 illustrates a high security optical lock embodiment of the present invention, referred to herein by the general reference numeral 30. A first optical key (KEY-1) 32, a second optical key (KEY-2) 34, and a third optical key (KEY-3) 36 each produce different bit serial optical coded message outputs at the touch of a button. Such keys are also preferably inserted into slots that help direct their light output with a user password modulated on the light carrier to a pair of optical lock receivers (RCVR-1, RCVR-2) 38 and 40. An engine timing device 42, and the RCVR-1 38 and RCVR-2 40 are wire-AND'ed through a series of opto-electric isolators 44, 46, and 48. When RCVR-1 38 recognizes an authorized keyholder's password, it operates the opto-electric isolator 46. When RCVR-2 40 recognizes an authorized keyholder's password, it operates the opto-electric isolator 46. When both opto-electric isolators 46 and 48 are ON, the timing device 42 and opto-electric isolator 44 are able to impress a pulse modulation on a laser diode 50, using a vehicle's electrical power system (VES). The laser diode 50 pipes its light output down a fiberoptic cable 52 into a protected engine compartment 54. Inside, a photovoltaic (PV) cell 56 receives the light energy and pulse modulation. The electrical power output of the PV cell 56 is filtered for DC from DC pulses by a rectifier 58 and a capacitor 60 and applied as the power supply input to an ignition system 62. The raw modulated signal from the PV cell 56 is applied to a timing input on the ignition system 62. A plurality of voltage output triggers 64, 66, 68, and 70 is produced which can be used to operate mechanical locks, solenoids, actuators, and ignition systems in cars. For example, triggers 64, 66, 68, and 70 can be connected to operate spark plugs, fuel injectors, diesel injectors, et cetera, based on the timing provided by the timing device 42.

Figure 3:
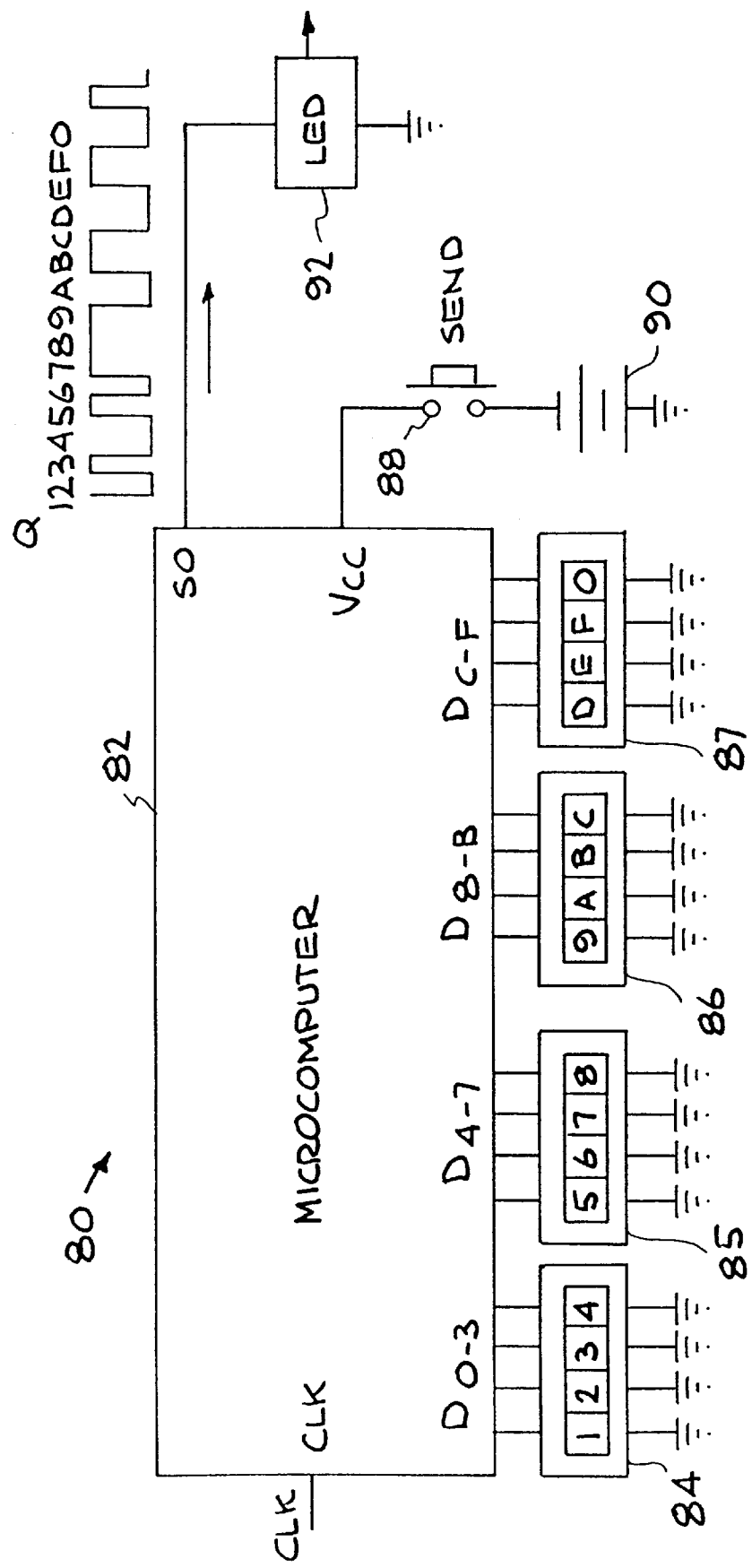
FIG. 3 is a schematic diagram of an optical key embodiment of the present invention and is similar to those described in FIGS. 1 and 2.

FIG. 3 is a schematic diagram of an optical key embodiment of the present invention and is similar to those described in FIGS. 1 and 2 and is referred to herein by the general reference numeral 80. The optical key 80 comprises a microcomputer 82 connected to receive digital numerics from a set of four four-digit thumbwheel switches 84–87. The microcomputer 82 is preferably a low power type such as the BASIC STAMP marketed by Parallax, Inc. (CA, USA). Such products typically use the Microchip Technology, Inc. (USA) PIC16C5X CMOS microcontroller clocked at 32K Hz. A "send" switch 88 connects operating power from a battery 90 to the microcomputer 82. In operation, a program within the microcomputer 82 comes alive when the "send" switch is activated and a serial output "SO" drives a light emitting diode (LED) 92 with some serial digital pattern that is a function of the thumbwheel switches 84–87. The LED 92 can comprise a high power 0.78 μm band GaAlAs laser diode with a multi-quantum well (MQW) structure such as a Hitachi America (Brisbane, Calif.) HL7851G. Such a laser diode can be driven with a laser diode driver, e.g., the LDD "P" series modulated laser diode driver marketed by Wavelength Electronics, Inc. (USA).

Figure 4:
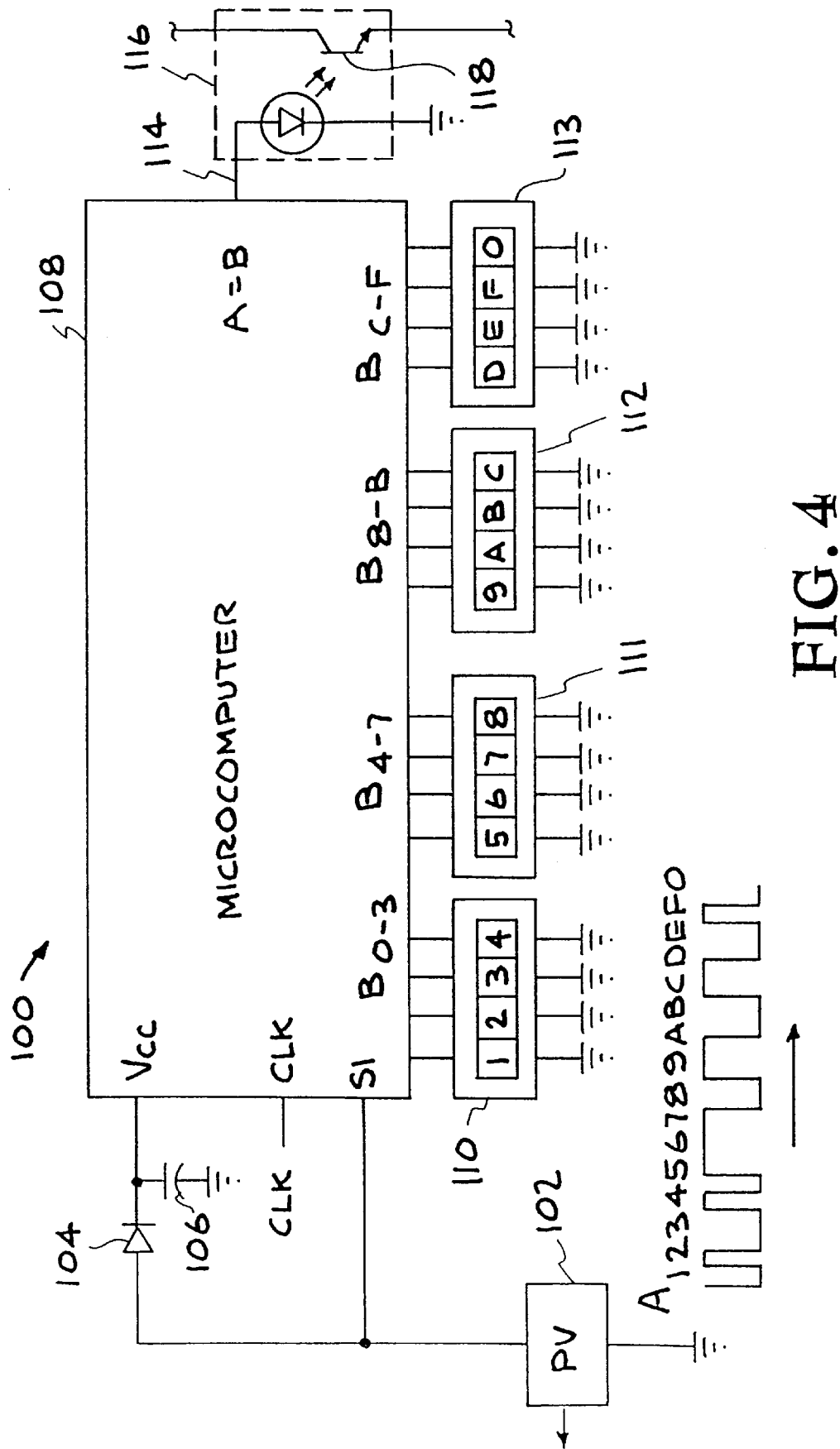
FIG. 4 is a schematic diagram of an optical lock embodiment of the present invention and is similar to those described in FIGS. 1 and 2.

FIG. 4 is a schematic diagram of an optical lock embodiment of the present invention and is similar to those described in FIGS. 1 and 2 and is referred to herein by the general reference numeral 100. The optical lock 100 comprises a photovoltaic cell 102 that receives optical energy and a key code, e.g., from the optical key 80. The photovoltaic cell 102 may comprise a six-volt 250 mW light-input GaAs photovoltaic power converter, such as a Photonic Power Systems, Inc. (Mountain View, Calif.) model PPC-6E-ST. A diode 104 and a capacitor 106 recover operating power from the photovoltaic cell 102 and the diode 104 provides enough isolation so that the digital amplitude modulation can be read by a serial input "SI" of a microcomputer 108. The microcomputer 102 is also preferably a low power type such as the PIC16C5X CMOS microcontroller clocked at 32K Hz. The microcomputer 108 is connected to receive digital keylock numerics from a set of four four-digit thumbwheel switches 110–113. The keylock numeric, or a number which is a function of it, is compared with the keycode received. If they match, an "A=B" output goes TRUE and drives a signal line 114 connected to an opto-coupler 116. A transistor 118 will turn on when the output signal line 114 goes TRUE. This can be used to control an electromechanical unlock solenoid on a car, for example.

Figure 5:
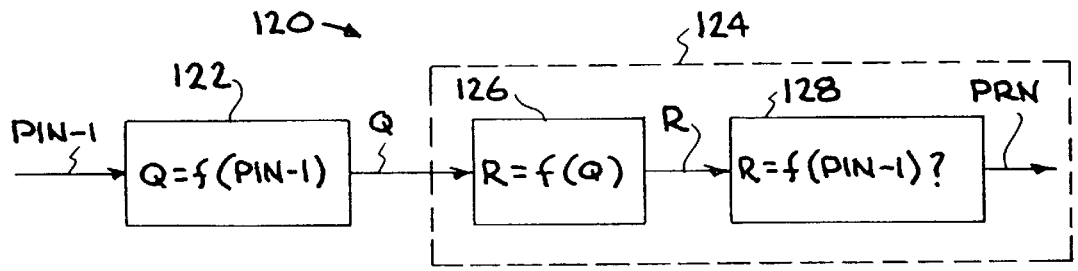
FIG. 5 is a dataflow diagram of a simple personal-identification-number (PIN-1) that is transformed in an optical key as in FIGS. 1 and 2 into a public-key encoded message, which is then decrypted back in an optical lock as in FIGS. 1 and 2 to verify user enrollment/authority.

FIG. 5 is a dataflow diagram of a key & lock system 120. A simple personal-identification-number (PIN-1) embedded in a key 122 is transformed into a public-key encoded message "Q". A lockset 124 includes a decryption device 126 that uses "Q" to find a value "R". A comparator 128 then checks to see if "R" could be a function of "PIN-1", if so a pseudorandom number "PRN" is output to operate some mechanical device.

Figure 6:
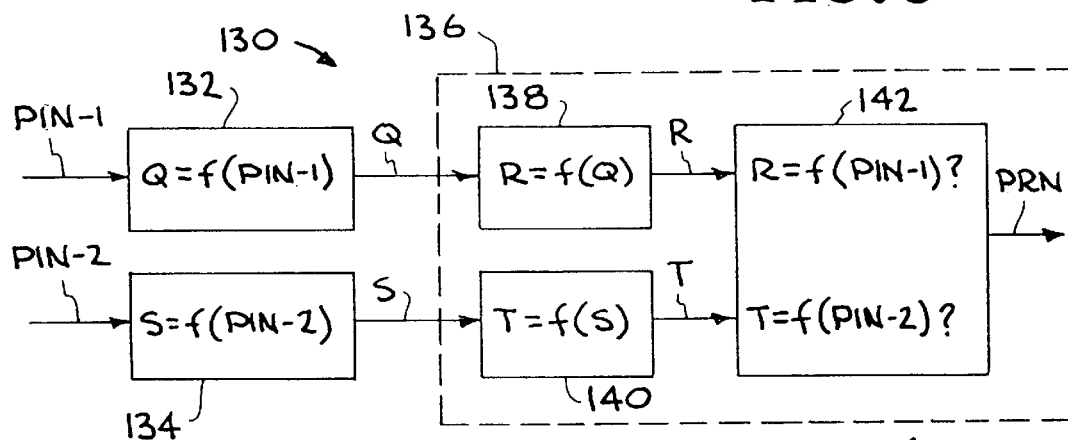
FIG. 6 is a dataflow diagram of a two-key system of the present invention in which a simultaneous pair of personal-identification-numbers (PIN-1, PIN-2) are independently transformed in respective optical keys, as in FIGS. 1 and 2, into a public-key-pair encoded message. An optical lock, as in FIGS. 1 and 2, is used to verify user enrollment/authority of both key holders and the coincidence of their operation.

FIG. 6 is a dataflow diagram of a double-key & lock system 130. A pair of personal-identification-numbers (PIN-1 and PIN-2) are embedded in a pair of keys 132 and 134. Such personal-identification-numbers are respectively transformed into a pair of public-key encoded messages "Q" and "S". A lockset 136 includes a pair of decryption devices 138 and 140 that use "Q" and "S" to independently find a value "R" and a value "T". A comparator 142 then checks to see if "R" could be a function of "PIN-1" and if "T" could be a function of "PIN-2". If both are true, a pseudorandom number "PRN" is output to operate some mechanical device.

Figure 7:
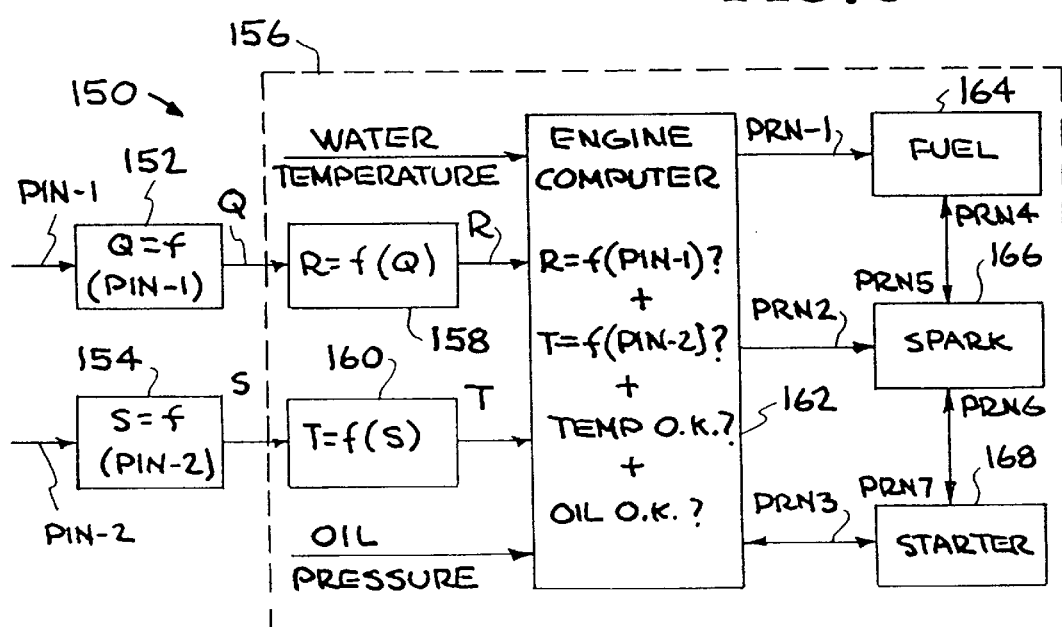
FIG. 7 is a dataflow diagram of a maximum security two-key system of the present invention in which a simultaneous pair of personal-identification-numbers (PIN-1, PIN-2) are independently transformed in respective optical keys, as in FIGS. 1 and 2, into a public-key-pair encoded message. A consensus optical lock, more complex than those in FIGS. 1 and 2, is used to verify user enrollment/authority of both key holders and the coincidence of their operation. The consensus optical lock is located within a protected engine compartment and further requires appropriate inputs from private engine sensors. The fuel, spark and starter systems must each and all agree that they have individually be authorized to operate before allowing any to function.

FIG. 7 is a dataflow diagram of a double-key & lock system 150. A pair of personal-identification-numbers (PIN-1 and PIN-2) are embedded in a pair of keys 152 and 154. Such personal-identification-numbers are respectively transformed into a pair of public-key encoded messages "Q" and "S". A protected compartment 156, such as the locked engine bay in an expensive automobile, includes a pair of decryption devices 158 and 160 that use "Q" and "S" to independently find a value "R" and a value "T". A computer 162 then checks to see if "R" could be a function of "PIN-1" and if "T" could be a function of "PIN-2". The computer further reads in the water temperature and oil pressure of an engine in the car. If both the comparisons of "R" and "T" are true, and the engine sensors indicate normal values, a set of pseudorandom numbers "PRN1–3" are output to respectively operate a fuel pump 164, an ignition spark system 166, and a starter motor 168.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. An optical key system, comprising:

a microcomputer connected to receive a digital numerical value from a set of password-input switches;

a "send" switch connected to provide operating power from a battery to the microcomputer;

a laser diode connected to a serial output port of the microcomputer; and an operating program disposed within the microcomputer and that comes alive when the "send" switch is activated such that said serial output drives the laser diode (a) with sufficient optical power to operate an isolated lock and (b) with a serial digital pattern that is a mathematical function of said set of password-input switches.

2. An optical lock, comprising:

a photovoltaic cell for receiving optical energy and a key code, from an optical key;

a diode and a capacitor combination connected to recover operating power from the photovoltaic cell;

a microcomputer connected by a serial input port to receive a modulated signal that represents said key code, and connected to receive operating power from the diode and a capacitor combination;

a set of unlock-value switches connected to the microcomputer such that a setting representing an unlock value may be compared to any said key code received by the photovoltaic cell;

wherein, if a match is detected by the microcomputer between said unlock value and said key code, an output "A=B" of the microcomputer indicates such a match with an electrical or optical signal.

3. An optical key & lock system, comprising:

a first microcomputer connected to receive a digital numeric value from a set of password-input switches, and disposed in a optical key;

a "send" switch connected to provide operating power from a battery to the microcomputer, and disposed in said optical key;

a laser diode connected to a serial output port of the microcomputer, and disposed in said optical key;

an operating program disposed within the microcomputer and that comes alive when the "send" switch is activated such that said serial output drives the laser diode with a serial digital pattern that is a mathematical function of said set of password-input switches, and disposed in said optical key;

a photovoltaic cell for receiving optical energy and a key code, from said optical key, and disposed in an independent and separate optical lock;

a diode and a capacitor combination connected to recover operating power from the photovoltaic cell, and disposed in said optical lock;

a microcomputer connected by a serial input port to receive a modulated signal that represents said key code, and connected to receive operating power from the diode and a capacitor combination, and disposed in said optical lock; and a set of unlock-value switches connected to the microcomputer such that a setting representing an unlock value may be compared to any said key code received by the photovoltaic cell, and disposed in said optical lock;

wherein, if a match is detected by the microcomputer between said unlock value and said key code, an output "A=B" of the microcomputer indicates such a match with an electrical or optical signal.

* * * * *